United States Patent
Chang et al.

(10) Patent No.: US 9,366,291 B2
(45) Date of Patent: Jun. 14, 2016

(54) METHOD FOR COMBINING BEARING AND SLEEVE

(71) Applicant: ASIA VITAL COMPONENTS CO., LTD., Sinjhuang District, New Taipei (TW)

(72) Inventors: Kuo-Chen Chang, New Taipei (TW); Kuo-Chieh Chao, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 248 days.

(21) Appl. No.: 13/904,005

(22) Filed: May 28, 2013

(65) Prior Publication Data

US 2014/0352126 A1   Dec. 4, 2014

(51) Int. Cl.
| | |
|---|---|
| B23K 26/22 | (2006.01) |
| B23K 26/24 | (2014.01) |
| B23K 26/28 | (2014.01) |
| F16C 33/08 | (2006.01) |
| F16C 35/02 | (2006.01) |

(52) U.S. Cl.
CPC .............. *F16C 33/08* (2013.01); *B23K 26/22* (2013.01); *B23K 26/24* (2013.01); *B23K 26/28* (2013.01); *F16C 35/02* (2013.01); *F16C 2226/36* (2013.01); *F16C 2360/46* (2013.01); *Y10T 29/49826* (2015.01)

(58) Field of Classification Search
CPC ........ B23K 26/00; B23K 26/22; B23K 26/24; B23K 26/28

USPC ........ 219/121.63, 121.64; 228/262.4, 262.41, 228/262.44, 262.6; 29/898, 898.04, 29/898.047, 898.054, 898.059

See application file for complete search history.

(56) References Cited

U.S. PATENT DOCUMENTS

| | | | | |
|---|---|---|---|---|
| 2,821,010 | A * | 1/1958 | Vasconi et al. | 29/898.059 |
| 5,529,404 | A * | 6/1996 | Robinson et al. | 384/617 |
| 5,676,469 | A * | 10/1997 | Sandy et al. | 384/296 |
| 8,615,884 | B2 * | 12/2013 | Kosaka et al. | 29/898.04 |
| 9,024,492 | B2 * | 5/2015 | Chang et al. | 310/90 |
| 2013/0077192 | A1 * | 3/2013 | Kosaka et al. | 360/244 |

FOREIGN PATENT DOCUMENTS

| | | |
|---|---|---|
| CN | 202732433 U | 2/2013 |
| CN | 202738347 U | 2/2013 |
| TW | M315480 U | 7/2007 |

\* cited by examiner

*Primary Examiner* — Samuel M Heinrich
(74) *Attorney, Agent, or Firm* — C. G. Mersereau; Nikolai & Mersereau, P.A.

(57) ABSTRACT

A method for combining a sleeve and bearings, comprising the steps of: providing a base having a sleeve; disposing at least one bearing in the sleeve; and providing a laser beam to illuminate and melt a contact place between the perimeter of the bearing and the sleeve such that the bearing and the sleeve is combined firmly. Therefore, the effects of securing the bearings, reinforcing the structure thereof, and increasing the lifetimes of the bearings and the sleeve can be achieved.

6 Claims, 8 Drawing Sheets

METHOD FOR COMBINING BEARING AND SLEEVE

BACKGROUND OF THE INVENTION

1. Field of the Invention

The present invention relates to a method for combining bearings and a sleeve and in particular to a method for combining bearings and a sleeve, which can secure the bearings, reinforce the structure thereof, and increase the lifetimes of the sleeve and bearings.

2. Description of Prior Art

Due to the scientific and technological development, the operating performance of electronic elements is getting higher, resulting in the increasing demand for heat dissipation performance of the electronic elements.

For example, the internal CPU in a computer host generates the most of the heat. In addition, the execution performance of the CPU will degrade as the temperature thereof increases. When the accumulated heat is over an acceptance limit of the CPU, the computer will be shut down. For a more serious case, it will cause burning and damage. Moreover, to overcome the problem of electromagnetic radiation, a case is generally used to enclose the computer host such that how to dissipate efficiently the heat generated from the CPU and other heated components (or elements) out of the case becomes an important issue.

Also, large electronic apparatus such as a work station or server reaches a high temperature in operation. If the operating temperature is over a specific working temperature, it will affect the working performance of the computer host such as a work station or server; even the electronic elements therein will be burned up and damaged. In particular, the database and files stored in the work station or server are extremely important; thus, a short-term shutdown or damage of the electronic apparatus will lead to heavy loss. Therefore, when the work station or server is set up, how to dissipate heat to maintain the apparatus temperature within the working temperature is a really critical design section.

As a result, a high efficiency heat dissipation unit is one of the most important researches of the current industry, whereby to equip the electronic elements generating heat and having a high temperature with the heat dissipation unit through which the heat generated by the electronic elements can be dissipated. The heat dissipation unit is generally a heat sink or a cooling fin operating with a cooling fan to dissipate heat.

Please refer to FIG. 1, which is an explosive perspective view of the prior art cooling fan. The cooling fan 1 comprises a base 11, a rotor set 12, and a stator set 13. The base 11 has a sleeve 111 with two bearings 112 disposed therein. The two bearings 12 have a tolerance fit with the internal diameter of the sleeve 111 such that the two bearings 112 can be disposed in the sleeve 111 and be prevented from falling out of the sleeve 111. The stator set 13 is sleeved around the sleeve 111. The rotor set 12 comprises a hub 121, a plurality of blades 122, and a shaft 123. The shaft 123 is inserted into the bearings 112. When the cooling fan 1 operates, the shaft 123 of the rotor set 12 rotates with respect to the bearings 112 and the bearings 112 are not fixed. As a result, when the shaft 123 rotates with respect to the bearings 112, the bearings 112 are subject to the shaft 123 to rotate or slip. After a long-term operation of the cooling fan 1, debris and powder are generated as a result of wear and tear, further resulting in failure of the bearings 12 and uneven running of the rotor set 12.

In summary, the prior art suffer from the following shortcomings:

1. The bearings are subject to the shaft to rotate or slip;
2. The lifetimes of the bearings and the sleeve are decreased.

Therefore, how to overcome the above problems and disadvantages is the focus which the inventor and the related manufacturers in this industry have been devoting themselves to.

SUMMARY OF THE INVENTION

Thus, to effectively overcome the above shortcomings, the primary objective of the present invention is to provide method for combining bearings and a sleeve, which can secure the bearings and reinforce the structure thereof.

The secondary objective of the present invention is to provide a method for combining bearings and a sleeve, which can increase the lifetimes of the sleeve and bearings.

To achieve the above objectives, the present invention provides a method for combining bearings and a sleeve, comprising the steps of:

providing a base having a sleeve;
disposing at least one bearing in the sleeve; and
providing a laser beam to illuminate and melt a contact place between the perimeter of the bearing and the sleeve such that the bearing and the sleeve is combined firmly.

By means of the combination method of the present invention, the bearing and the sleeve are combined firmly to achieve the effects of securing the bearing and reinforcing the structure thereof. Also, the lifetimes of the bearing and the sleeve are increased.

DETAILED DESCRIPTION OF THE INVENTION

The above objectives of the present invention and the features of structure and function of the present invention are described according to the preferred embodiments in figures.

Figure 1:
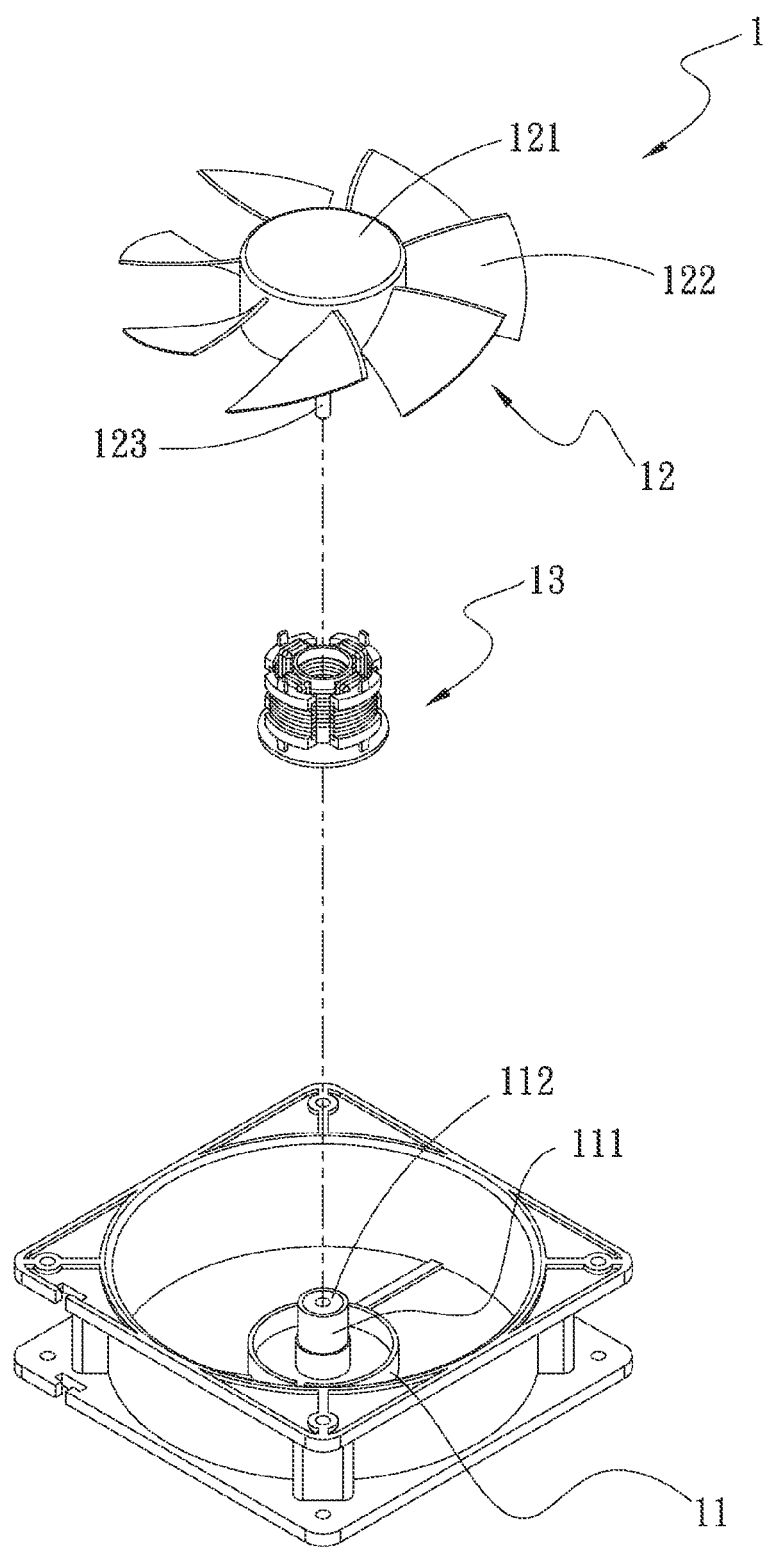
FIG. 1 is an explosive perspective view of a sleeve and bearings of the prior art.
Figure 2A:
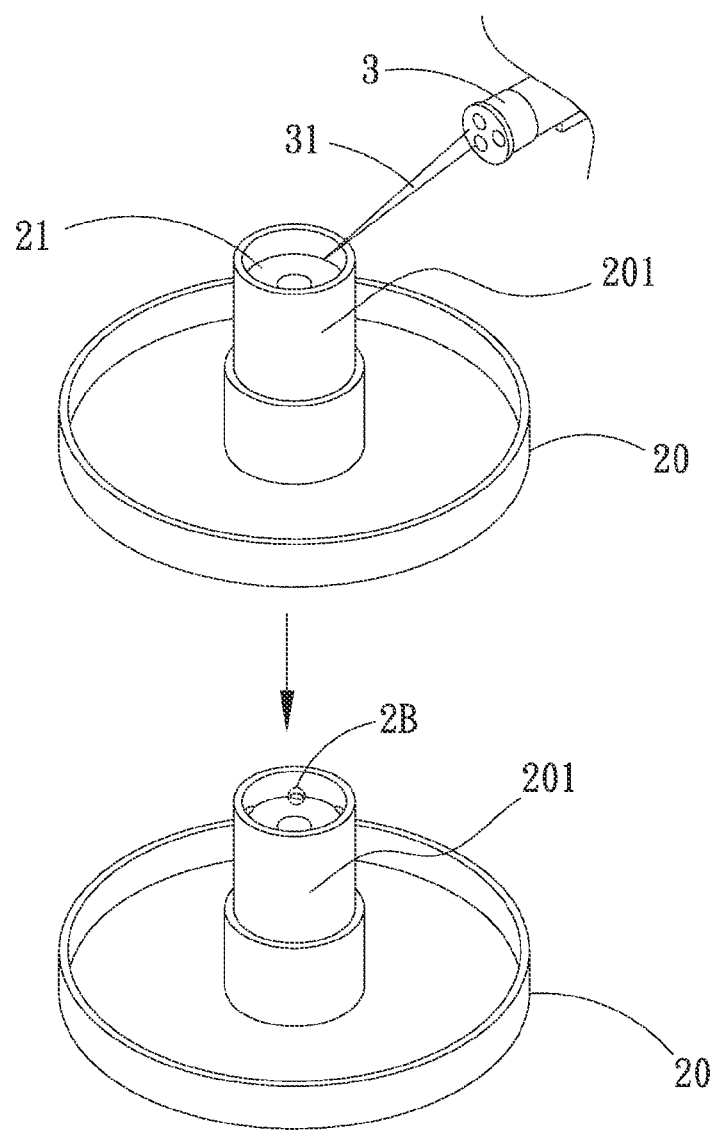
FIG. 2A is a manufacturing perspective schematic of a method for combining bearings and a sleeve according to the first embodiment of the present invention.
Figure 2B:
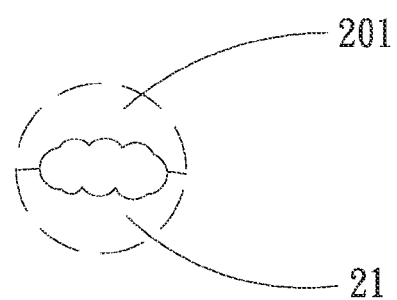
FIG. 2B is a manufacturing magnifying view of the method for combining bearings and a sleeve according to the first embodiment of the present invention.
Figure 2C:
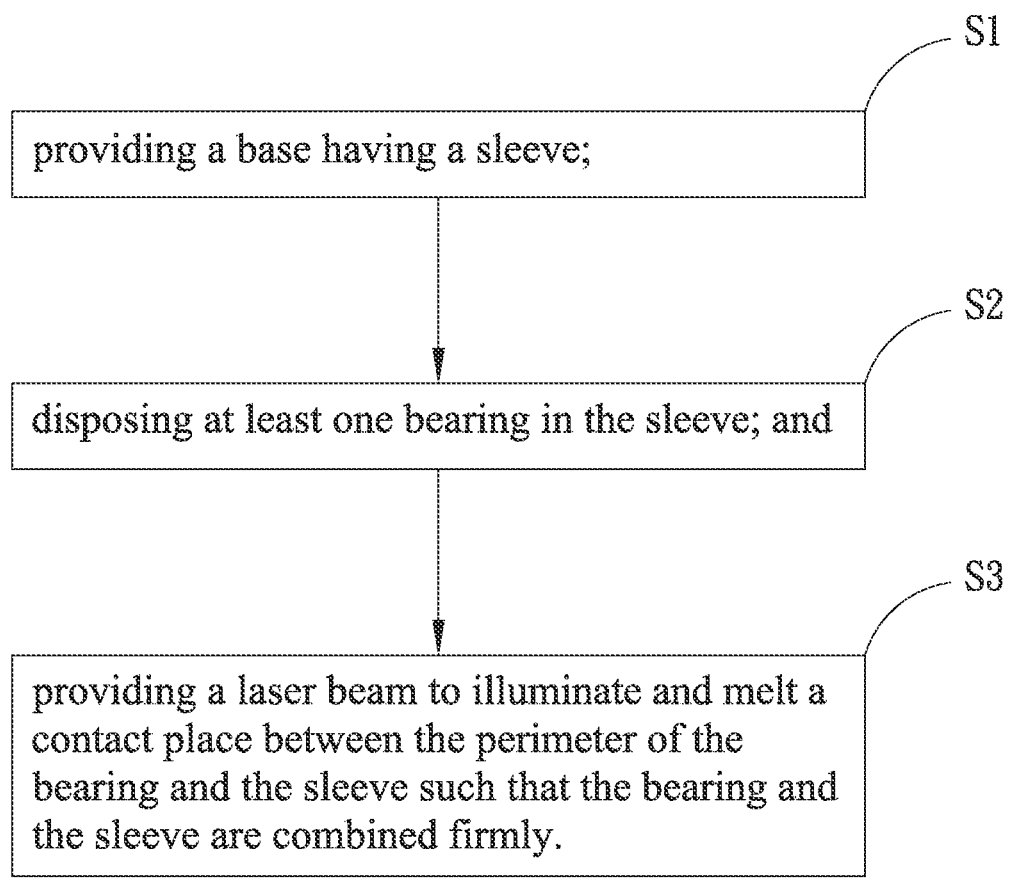
FIG. 2C is a flow chart of the method for combining bearings and a sleeve according to the first embodiment of the present invention.

Please refer to FIGS. 2A, 2B, and 2C, which are the manufacturing perspective schematic, the manufacturing magnifying view, and the flow chart of the method for combining bearings and a sleeve according to the first embodiment of the present invention, respectively. As shown in the figures, a method for combining bearings and a sleeve, comprising the steps of:

S1: providing a base having a sleeve;

A base 20 is provided and the base 20 has a sleeve 201.

S2: disposing at least one bearing in the sleeve; and

At least one bearing 21 is disposed in the sleeve 201.

S3: providing a laser beam to illuminate and melt a contact place between the perimeter of the bearing and the sleeve such that the bearing and the sleeve are combined firmly.

A laser beam 31 is provided by a laser device 3. The laser beam 31 melts the contact place between the perimeter of the bearing 21 and the sleeve 201 by laser welding such that the bearing 21 and the sleeve 201 are combined firmly. The laser welding can be performed by spot welding.

Additionally, the materials of the sleeve 201 and the bearing 21 in the preferred embodiment are the same for explanation. Both the materials of the sleeve 201 and the bearing 21 are copper or iron, but not limited to these. In the implementation of the present invention, the materials of the sleeve 201 and the bearing 21 may be different. For example, the sleeve 201 is made of copper and the bearing 21 is made of iron, or the sleeve 201 is made of iron and the bearing 21 is made of copper.

By means of the method for combining bearings and a sleeve of the present invention, the contact place between the sleeve 201 and the perimeter of the bearing 21 are melted by laser welding such that the sleeve 201 and the bearing 21 are combined firmly, effectively improving the structural strengths of the sleeve 201 and the bearing 21. Moreover, due to easy machining by laser welding, the cost and working hours can be reduced. Further, the bearing 21 will not spin during the operation of the fan, decreasing the failure rate and increasing the lifetimes of the bearing 21 and the sleeve 201.

Figure 3A:
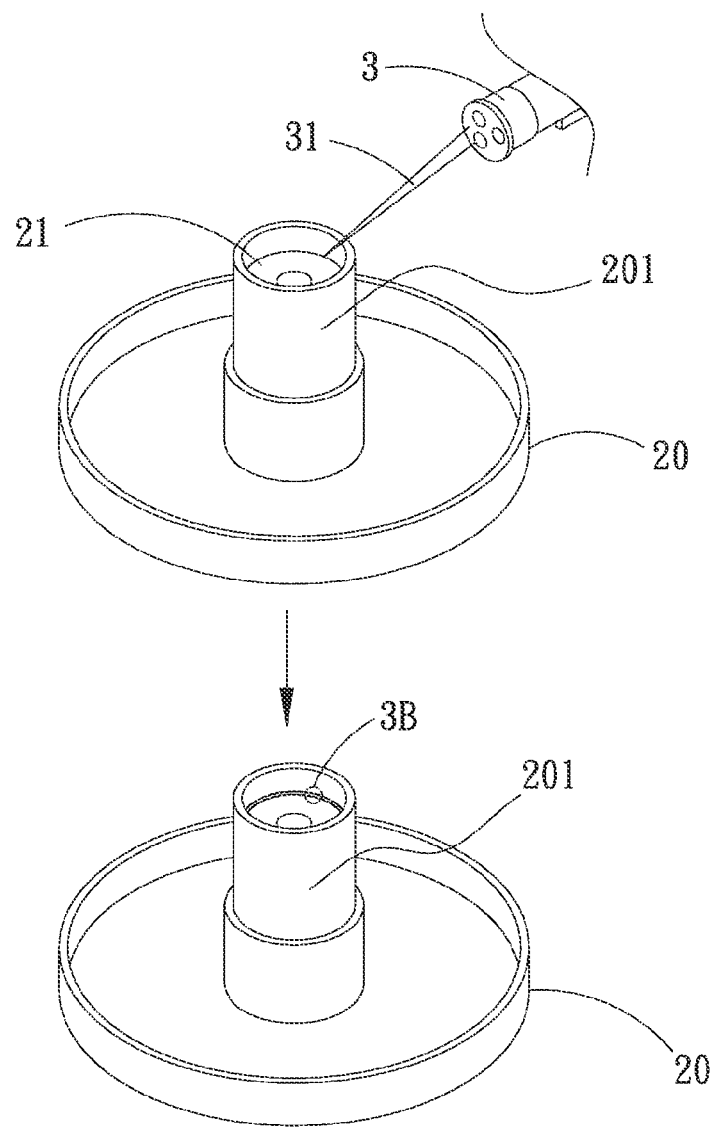
FIG. 3A is a manufacturing perspective schematic of the method for combining bearings and a sleeve according to the second embodiment of the present invention.
Figure 3B:
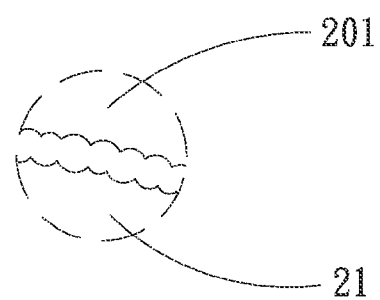
FIG. 3B is a manufacturing magnifying view of the method for combining bearings and a sleeve according to the second embodiment of the present invention.

Please refer to FIGS. 3A and 3B, which are the manufacturing perspective schematic and the manufacturing magnifying view of the method for combining bearings and a sleeve according to the second embodiment of the present invention, respectively. In the current embodiment, some elements in the method for combining bearings and the sleeve and the relation of elements are the same as those in the previous embodiment, thus not described again here. The only difference is that in the current embodiment the laser welding is performed by continuous welding; similarly, thus, the sleeve 201 and the bearing 21 are combined firmly. Further, the structural strengths of the sleeve 201 and the bearing 21 are improved; the lifetimes of the sleeve 201 and the bearing 21 are increased.

Figure 4A:
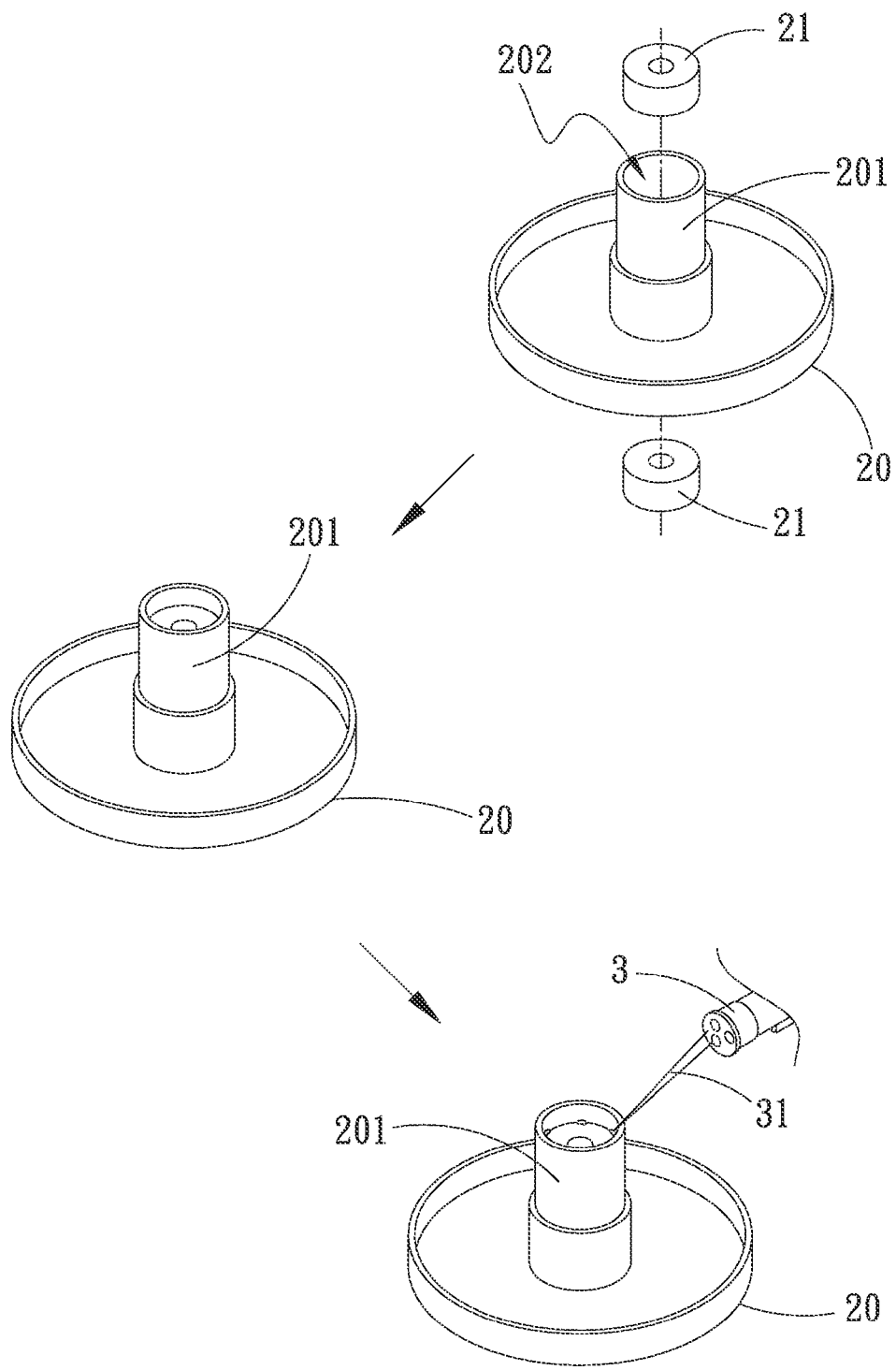
FIG. 4A is a manufacturing perspective schematic of the method for combining bearings and a sleeve according to the third embodiment of the present invention.
Figure 4B:
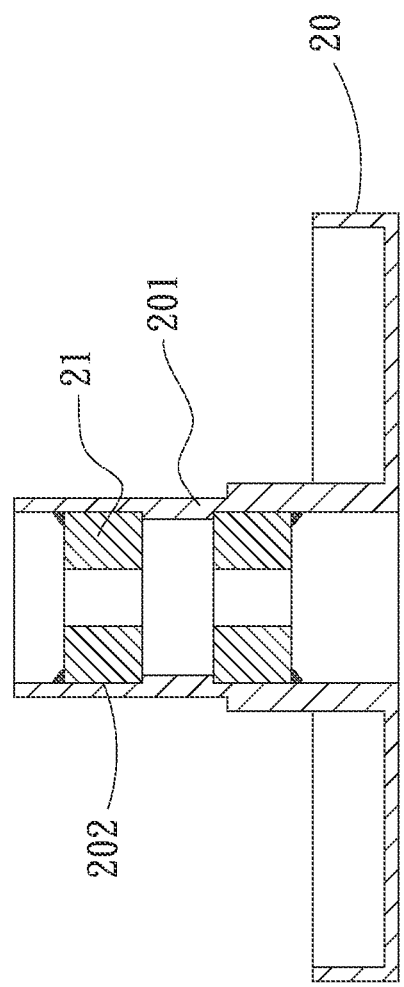
FIG. 4B is a manufacturing cross-sectional view of the method for combining bearings and a sleeve according to the third embodiment of the present invention.
Figure 4C:
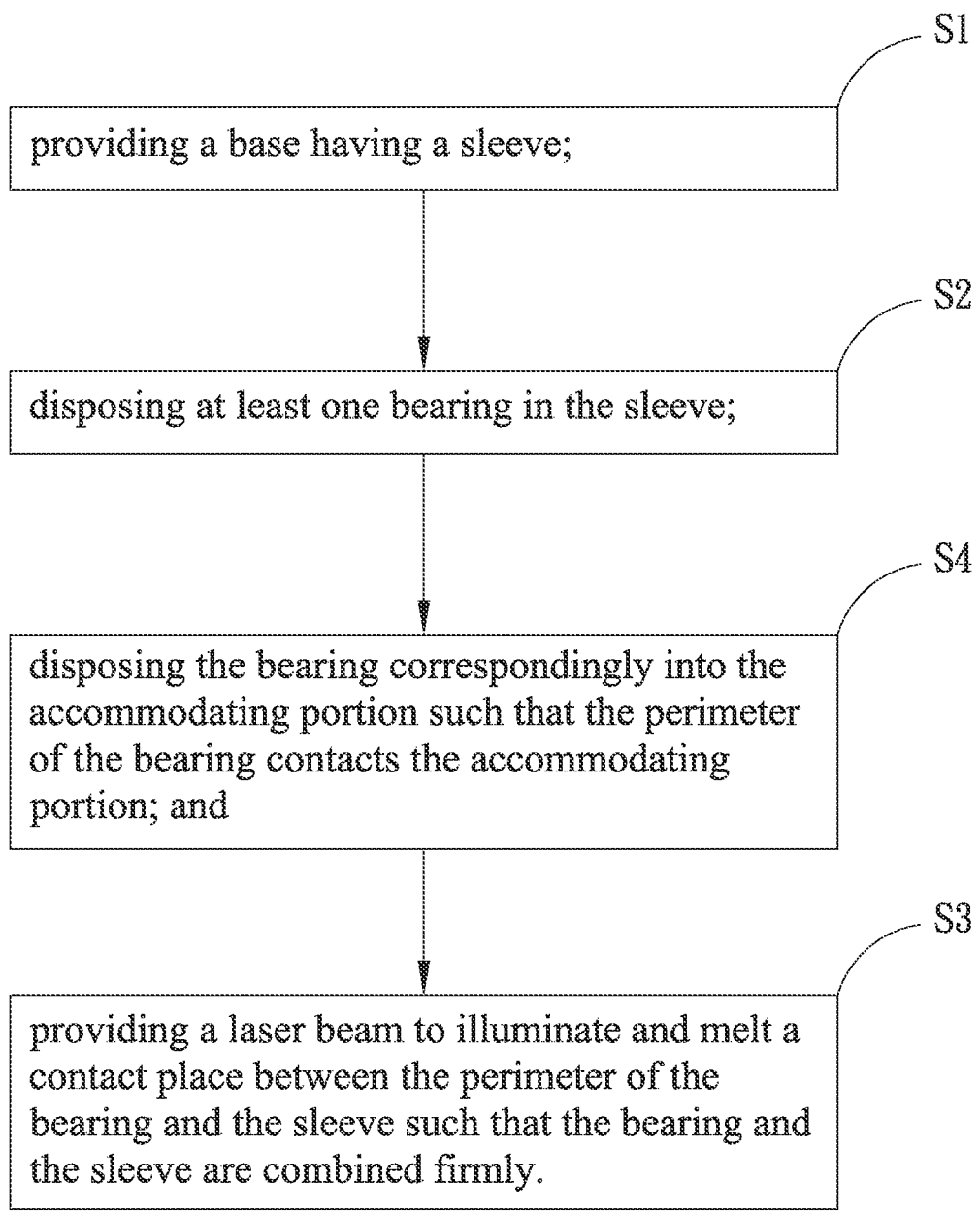
FIG. 4C is a flow chart of the method for combining bearings and a sleeve according to the third embodiment of the present invention.

Please refer to FIGS. 4A, 4B, and 4C, which are the manufacturing perspective schematic, the manufacturing cross-sectional view, and the flow chart of the method for combining bearings and a sleeve according to the third embodiment of the present invention, respectively. In the current embodiment, some elements in the method for combining bearings and the sleeve and the relation of elements are the same as those in the previous embodiment, thus not described again here. The only difference is that in the current embodiment, an inner wall of the sleeve 201 forms at least one accommodating portion 202 and the bearings 21 are accommodated correspondingly in the accommodating portion 202, in which after Step S2: disposing at least one bearing in the sleeve, the method further comprises Step S4: disposing the bearing correspondingly into the accommodating portion such that the perimeter of the bearing contacts the accommodating portion.

The above-mentioned Step S4: disposing the bearing correspondingly into the accommodating portion such that the perimeter of the bearing contacts the accommodating portion.

After the above-mentioned bearings 21 are disposed in the accommodating portion 202 of the inner wall of the sleeve 201, the bearings 21 are disposed correspondingly into the accommodating portion 202 such the perimeter of the bearing 21 contacts the accommodating portion 202.

Figure 5:
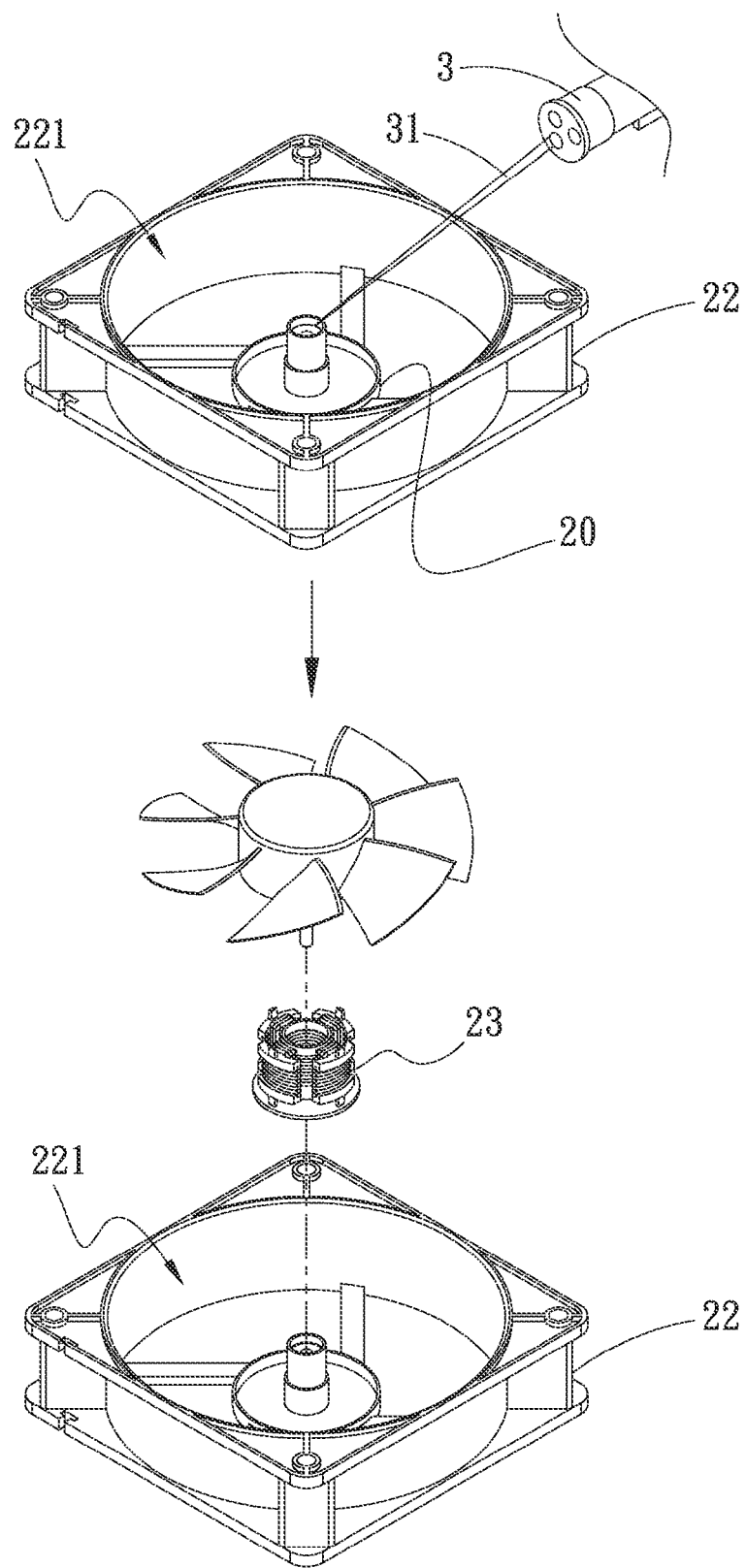
FIG. 5 is a manufacturing perspective view of the method for combining bearings and a sleeve according to the third embodiment of the present invention.

Finally, please refer to FIG. 5, which is a manufacturing perspective view of the method for combining bearings and a sleeve according to the third embodiment of the present invention. In the current embodiment, some elements in the method for combining bearings and the sleeve and the relation of elements are the same as those in the previous embodiment, thus not described again here. The only difference is that the current embodiment further comprises a frame 22 having a receiving space 221 for receiving a stator 23. The base 20 is disposed at the center of the frame 22.

In summary, the present invention has the following advantages over the prior art.

1. The bearings can be secured and the structural strength is improved.

2. The lifetimes of the bearings and the sleeve are increased.

The present invention has been explained by the above description. It will be understood that the above description is only about some preferred embodiments which can not be used to confine the implementation scope of the present invention. All equivalent variations and modifications according to the claimed scope of the present invention should be embraced by the scope of the appended claims of the present invention.

What is claimed is:

1. A method for combining bearings and a sleeve, comprising the steps of:
    providing a base having a sleeve, the sleeve having at least one generally centrally located accommodating portion;
    disposing at least one bearing in the sleeve such that the perimeter thereof a buts the accommodating portion and contacting the sleeve, the at least one bearing being accessible from outside the sleeve; and
    providing a laser beam from outside of the sleeve to illuminate and melt a contact place between the perimeter of the bearing and the sleeve by laser welding such that the bearing and the sleeve are combined firmly; wherein the laser welding is one of spot welding and continuous welding.

2. The method according to claim 1, wherein an inner wall of the sleeve forms said at least one accommodating portion and the bearing is accommodated correspondingly in the accommodating portion.

3. The method according to claim 1, wherein the base is disposed at the center of a frame.

4. The method according to claim 3, wherein the frame has a receiving space for receiving a stator.

5. The method according to claim 1, wherein the material of the sleeve is the same as or different from that of the bearing.

6. The method according to claim 1, wherein the material of the sleeve and the material of the bearing are selected from iron and copper.

* * * * *